United States Patent
Kishi et al.

(10) Patent No.: US 6,932,925 B2
(45) Date of Patent: Aug. 23, 2005

(54) METHOD OF MANUFACTURING A SUPER-LIGHTWEIGHT CERAMIC FOAM

(75) Inventors: Kazushi Kishi, Saga-ken (JP); Eiji Tani, Saga-ken (JP); Eishi Maeda, Saga-ken (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 41 days.

(21) Appl. No.: 10/677,338

(22) Filed: Oct. 3, 2003

(65) Prior Publication Data

US 2004/0077480 A1 Apr. 22, 2004

(30) Foreign Application Priority Data

Oct. 18, 2002 (JP) ........................................ 2002-303707

(51) Int. Cl.[7] .............................................. B29C 44/00
(52) U.S. Cl. .......................................... 264/43; 264/50
(58) Field of Search ............................ 264/43, 621, 50, 264/42

(56) References Cited

U.S. PATENT DOCUMENTS 3,935,060 A * 1/1976 Blome et al. ................ 162/152
6,602,449 B1 * 8/2003 Grader et al. .................. 264/43

* cited by examiner

*Primary Examiner*—Steven P. Griffin
*Assistant Examiner*—Carmen Lyles-Irving
(74) *Attorney, Agent, or Firm*—Sughrue Mion, PLLC

(57) ABSTRACT

A super-lightweight ceramic foam with a cellular structure effectively reinforced by ceramic short fibers, which has a density of 0.2 g/cm$^3$ or less and a sufficient strength. The ceramic foam is prepared by evenly dispersing ceramic short fibers throughout a nonaqueous solvent through the use of the reactivity of metal alkoxide with the surface of the ceramic short fibers, adding into the nonaqueous solvent an aqueous slurry containing ceramic powder dispersed therein, allowing the evenly dispersed ceramic fibers to move into an aqueous phase separately from a nonaqueous solvent phase so as to obtain an aqueous slurry containing the ceramic fibers evenly dispersed therein, and foaming and firing the aqueous slurry.

8 Claims, No Drawings

METHOD OF MANUFACTURING A SUPER-LIGHTWEIGHT CERAMIC FOAM

CROSS-REFERENCE TO RELATED APPLICATION

This application is based upon and claims the benefit of priority from Japanese Patent Application No. 2002-303707, filed Oct. 18, 2002, the entire contents of which are incorporated herein by reference.

FIELD OF THE INVENTION

The present invention relates to a super-lightweight ceramic foam which is reinforced by ceramic short fibers evenly dispersed therein. The present invention also relates to a method of producing a super-lightweight ceramic foam by use of an aqueous slurry containing ceramic short fibers, wherein the ceramic short fibers are evenly dispersed therein and are not entangled with each other or agglomerated.

BACKGROUND OF THE INVENTION

The following primary methods of producing super-lightweight ceramic foams are known in the art.

Impregnating a polyurethane foam having continuous cells with a slurry containing, among other things, ceramic powder and an organic binder, drying and heating the impregnated foam to remove the organic component therefrom, and sintering the foam.

Mixing a foamable polyurethane material with a slurry containing, among other things, ceramic powder and an organic binder, foaming the mixture, solidifying the foam, heating the solidified foam to remove the organic component therefrom, and sintering the foam.

Adding a surfactant into a dispersion medium containing ceramic powder and a hydrophobic resin binder to emulsify the hydrophobic resin binder therein, foaming the emulsion, solidifying the foam, heating the solidified foam to remove the organic component therefrom, and sintering the foam.

Adding a filler, such as plastic beads, into a slurry, wherein the filler is to be thermally removed in a subsequent firing process in order to form cells, drying the slurry, and firing the dried body to produce a material having a foam-like structure.

Also, the present inventors have previously proposed a method of producing a lightweight ceramic material, comprising adding a given amount of inorganic power into a diluted aluminum-hydroxide sol solution serving as a binder, foaming the solution, drying the foam, and firing the foam, as described in Japanese Patent Laid-Opening Publication No. 2002-114584, which is incorporated herein by reference in its entirety.

In the above-described methods 1–4 of producing ceramic foams, a large amount of organic matter is commonly added as a binder or filler. Thus, methods 1–4 inevitably involve a problem of cracks and/or fractures possibly caused by gases generated in the process of thermally removing the organic matter in advance of sintering the ceramic powder, or the difference in thermal expansion between the organic and ceramic phases. In particular, a lightweight ceramic foam is formed having a cellular structure with a thin cell wall having poor strength, and thus the above-described adverse effect leads to more serious defects, such as deteriorated strength or powdering due to micro-cracks caused in the sintering process. While this problem may be solved by providing enhanced strength in the cellular structure without increasing the amount of the binder, the cell wall of the cellular structure inevitably becomes thicker, resulting in lowered porosity and increased density in a ceramic foam to be obtained.

A lightweight ceramic foam produced through the above-described method using a diluted aluminum-hydroxide sol solution also has a low-strength cellular structure, and further involves a problem of limited uses due to powdering caused by scratching or scraping the ceramic foam.

Thus, when a ceramic foam is produced with a higher porosity to facilitate reduction in the weight thereof, the strength of its cellular structure is reduced accordingly and must be compensated for without an increase in the density of the ceramic foam. In this connection, the inventors are not aware of any attempt to disperse ceramic short fibers in a ceramic foam to achieve the reinforcement of its cellular structure.

Monolithic ceramics reinforced by ceramic short fibers dispersed therein are known. In a process of producing such monolithic ceramics, the ceramic short fibers are added into a raw material slurry directly or after having been mixed with a dispersion medium containing any suitable type of surfactant, and the slurry is simply stirred using a mechanical blender, such as a ball mill or attritor mill, to facilitate dispersion of the ceramic short fibers throughout the slurry.

However, the ceramic short fibers generally become entangled with each other and agglomerate, and the above-described dispersion method does not allow such ceramic short fibers to be evenly dispersed throughout the slurry. Particularly in the process of dispersing ceramic short fibers in a lightweight ceramic foam, agglomerates of short fibers cause a critical defect by damaging the thin cell wall of the foam's cellular structure. In addition, if the slurry is stirred in the blender for a long time, the fibers will be inevitably damaged by media balls in the blender. The intended purpose of dispersing ceramic short fibers in the ceramic matrix is to reinforce the cellular structure or provide a higher toughness to the cellular structure by utilizing the toughness of the ceramic short fiber. If the fiber itself is damaged in the dispersion process, the expected effect will be significantly deteriorated.

SUMMARY OF THE INVENTION

In view of the above problems, it is therefore an object of the present invention to provide a super-lightweight ceramic foam capable of achieving a previously unattainable high porosity and a sufficient strength based on a cellular structure reinforced by ceramic short fibers.

It is another object of the present invention to provide a method of producing a super-lightweight ceramic foam, capable of overcoming the previously unsolved problems in conventional processes of dispersing ceramic short fibers, and providing an improved super-lightweight ceramic foam reinforced by ceramic short fibers evenly dispersed therein.

More specifically, as disclosed in Japanese Patent No. 1332466, which is incorporated herein by reference in its entirety, the inventors verified that when ceramic powder is mixed with a solvent having, among other things, aluminum alkoxide dissolved therein, a reaction layer between the aluminum alkoxide and the ceramic powder is formed on the surface of the ceramic powder to allow the ceramic powder to be evenly dispersed throughout the solvent, and the evenly dispersed ceramic powder can serve as a ceramics raw material in a sintering process to provide drastically improved properties in the resulting sintered body.

Through subsequent research, it was found that the above-described interaction with metal alkoxide is also significantly exhibited by ceramic short fibers. It was also found that when a large amount of an aqueous solution or an aqueous slurry containing ceramic powder is added to a slurry of ceramic short fibers evenly dispersed in a nonpolar solvent having metal alkoxide dissolved therein, the entire ceramic short fibers evenly dispersed in the nonpolar solvent are transferred to an aqueous phase, and a limpid nonpolar solvent is left on the aqueous phase. This supernatant nonaqueous phase can be removed to obtain an aqueous solution or aqueous slurry containing ceramic short fibers evenly dispersed therein, and the aqueous solution or aqueous slurry can be used as a raw material capable of providing a super-lightweight ceramic foam having a high-strength cellular structure and excellent properties.

In order to achieve the objects of the invention, there is provided a super-lightweight ceramic foam having a cellular structure formed by foaming one of an aqueous slurry containing ceramic powder and ceramic short fibers dispersed evenly throughout, and an aqueous slurry containing ceramic short fibers dispersed evenly throughout an aqueous solution having a component serving as a raw material of ceramic powder dissolved therein, and firing the foamed slurry. The ceramic short fibers are evenly dispersed throughout the foam's cellular structure to effectively reinforce the cellular structure, and the ceramic foam has a density of $0.2$ g/cm$^3$ or less.

In the above-described ceramic foam, each of the ceramic short fibers may have a length 1.5 or more times greater than the diameter of each cell in the cellular structure. The length of the ceramic short fibers is such that it allows them to be evenly dispersed in the foam's cellular structure.

The present invention also provides a method of producing a super-lightweight ceramic foam. The method comprises the steps of adding ceramic short fibers into a nonaqueous solvent containing metal alkoxide dissolved therein, dispersing the ceramic short fibers in the nonaqueous solvent, adding one of an aqueous slurry containing ceramic powder, and an aqueous solution containing a component serving as a raw material of ceramic powder dissolved therein, into the nonaqueous solvent, stirring the obtained mixture, allowing the mixture to separate into an aqueous phase and an nonaqueous phase, removing the supernatant nonaqueous phase to obtain an aqueous slurry containing the ceramic short fibers dispersed therein, adding a foaming agent into the slurry, foaming the slurry under mechanical stirring, filling and drying the foamed slurry in a mold to form a molded body, and firing the molded body.

In the above-described method, the ceramic short fibers may be added into the nonaqueous solvent in the range of 5 to 95 weight % relative to the ceramic material contained in the aqueous slurry or the aqueous solution.

In the above-described method, the aqueous slurry or the aqueous solution may include mixed therewith or dissolved therein a substance serving as a sintering aid and/or a particle growth inhibitor.

According to the present invention, ceramic short fibers can effectively reinforce the cellular structure of a ceramic foam having an inherently low strength to provide a super-lightweight ceramic foam with a previously unattainable high porosity and a sufficient strength. Further, the method of the present invention allows ceramic short fibers to be evenly dispersed throughout the cellular structure of a ceramic foam to provide an improved super-lightweight ceramic foam having excellent properties.

Other features and advantages of the present invention will be apparent from the detailed description.

DESCRIPTION OF THE PREFERRED EMBODIMENT

The present invention will now be described in detail in conjunction with specific examples.

For the purpose of reinforcing a ceramic foam with ceramic short fibers, each of the ceramic short fibers must have a length 1.5 or more times greater than the diameter of each cell in a cellular structure formed by foaming an aqueous solution or an aqueous slurry containing the ceramic fibers dispersed therein. If the length of a ceramic fiber is less than the diameter of the cell, the fiber cannot be arranged in such a manner that it serves as a bridge between a plurality of cells, and thus the cellular structure cannot be reinforced. If the ceramic fibers are too long, they cannot be evenly dispersed throughout the cellular structure. A cellular structure formed by a method according to the present invention described herein below has cells with a diameter of 200 to 500 $\mu$m. In this case, a ceramic short fiber to be used therein preferably has a length of 0.5 to 5 mm.

In a super-lightweight ceramic foam of the present invention, each ceramic short fiber is attached to a plurality of cells, and a plurality of such cells are assembled together to form a cellular structure. Thus, the cellular structure can be effectively reinforced by the ceramic short fibers to allow a ceramic foam to be increased in porosity or reduced in weight while maintaining excellent properties.

In the method of the present invention, for the purpose of dispersing the aforementioned ceramic short fibers in a ceramic foam, the ceramic short fibers are first added into a hydrophobic organic solvent containing a small amount of metal alkoxide dissolved therein. The metal alkoxide to be dissolved in the solvent is preferably in the range of about 0.1 to 20 weight parts, more preferably 0.5 to 10 weight parts, relative to 100 weight parts of the ceramic short fibers to be added in the solvent. While the ceramic short fibers may be added in any amount such that they can be adequately dispersed throughout the organic solvent, it is desired to determine the amount in consideration of the amount of aqueous solution or aqueous slurry to be subsequently added into the metal alkoxide solution, as described later.

In the organic solvent added with the ceramic short fibers, the metal alkoxide reacts with a hydroxyl group on the surface of the ceramic short fibers, as shown in the following formula (1), to form a reaction layer, and an alkyl group of the metal alkoxide acts to facilitate dispersion of the ceramic short fibers throughout the organic solvent.

$$(\text{ceramics})-\text{OH}+\text{M}(\text{OR})_n \rightarrow (\text{ceramics})-\text{O}-\text{M}(\text{OR})_{n-1}+\text{ROH} \quad (1)$$

Thus, the ceramic short fibers can be evenly dispersed throughout the solvent using a mechanical stirrer or by ultrasonic-irradiation from an ultrasonic stirrer, without any difficulties.

After the ceramic short fibers are sufficiently dispersed throughout the organic solvent, a large amount of aqueous solution or aqueous slurry is added to the solvent, and the mixture is stirred. As a result of the addition of the aqueous solution or aqueous slurry, the alkyl group of the metal alkoxide is hydrolyzed and changed to a hydroxyl group, as shown in the following formula (2), and consequently the ceramic short fibers lose their lipophilic property. Thus, the ceramic short fibers quickly move to the aqueous phase, and the mixture separates into an aqueous solution phase containing the ceramic short fibers dispersed therein, and an organic solvent phase.

$$\text{(ceramics)-O-(MOR)}_{n-1} + H_2O \rightarrow \text{(ceramics)-O-M(OH)}_{n-1} + ROH \quad (2)$$

Then, the separated supernatant organic solvent phase is removed through a decantation-process or the like, to obtain an aqueous solution or aqueous slurry containing the ceramic short fibers dispersed therein.

In the above-described process, if water, i.e. the aqueous solution or aqueous slurry, is added in an insufficient amount, the metal alkoxide will be condensed on the surface of the ceramic short fibers, as shown in the following formula (3), and thus the ceramic short fibers will be undesirably aggregated.

$$\text{(ceramics)-O-(MOR)}_{n-1} + \text{(ceramics)-O-M(OH)}_{n-1} \rightarrow$$
$$\text{(ceramics)-O-M(OH)}_{n-2}\text{-O-M(OR)}_{n-2}\text{-(ceramics)} + ROH \quad (3)$$

Thus, it is desirable to add the aqueous solution or aqueous slurry in an amount that causes no aggregation of the ceramic short fibers. While the desired amount varies according to the amount or type of the ceramic short fibers, if the organic solvent contains 10 weight part or more of the ceramic short fibers relative to 100 weight part of the organic solvent, the volume of the aqueous solution or aqueous slurry should be at least equal to or greater than one-fourth of that of the organic solvent.

Preferably, a component serving as a peptizer or promoting peptization is contained in the aqueous solution or aqueous slurry to be added into the nonaqueous solvent containing the ceramic short fibers dispersed therein, to facilitate dispersion of the ceramic short fibers in the aqueous phase. The component promoting peptization may be an acid, a base or a polyacrylic ammonium generally used as a peptizer. On the other hand, any component that causes ceramic short fibers to aggregate is preferably not contained in the aqueous solution or aqueous slurry. For subsequent molding and firing processes, a salt serving as a sintering aid and/or a particle growth inhibitor may be dissolved in the aqueous solution or aqueous slurry to provide a ceramic foam having a more even structure.

The present invention is not limited to a specific metal alkoxide. Any suitable metal alkoxide capable of being dissolved in a hydrophobic organic solvent and being formed as a ceramic martial, such as oxide, nitride or carbide, by itself through a reaction in the subsequent heat treatment. Among the metal alkoxides fulfilling such requirements, one may be selected depending on the composition of the intended ceramic foam, or a plurality of metal alkoxides may be used in combination depending on the composition of the intended ceramic foam.

The present invention utilizes the reaction between the hydroxyl group on the surface of the ceramic short fibers and the metal alkoxide to facilitate dispersion of the ceramic short fibers throughout the solvent. Thus, a ceramic short fiber to be used in the present invention must have a hydroxyl group for reacting with the metal alkoxide. However, all ceramic short fibers, except for those having a coated surface, can be used in the present invention because the uncoated surface of a ceramic short fiber is oxidized or hydrolyzed by water vapor in the atmosphere and thus has many hydroxyl groups thereon. Even if a ceramic short fiber has a surface with a coating formed using a sizing agent or the like, it can be used by removing such a coating in advance through scrubbing or calcination. Any inorganic fiber, such as glass fiber and carbon fiber, having a surface capable of reacting with the metal alkoxide may also be used.

In the present invention, the inorganic powder to be used in the aqueous slurry may include, but is not limited to, alumina, mullite, zirconia, silicon nitride, silicon carbide and any other material generally used as refractory ceramics. Two or more kinds of the powders may be used in combination. Further, a substance serving as a sintering aid and/or particle growth inhibitor for the powder, such as yttria or magnesia, may be used in combination therewith. The substance serving as a sintering aid and/or particle growth inhibitor may be dissolved in the form of a salt thereof and added into the slurry. Inorganic powder having an excessively large particle size can be precipitated by its own weight, and inorganic powder having an excessively fine particle size can increase the viscosity of the aqueous slurry due to the increased specific surface area of the powder. Thus, the inorganic powder preferably has an average particle size in the range of about 0.2 to 5 μm. Further, two or more kinds of the powders different in particle size may be used in combination.

In the present invention, the aqueous solution containing a component serving as a raw material of ceramic powder may be an aluminum-hydroxide sol solution, a silica sol solution, a titanium-hydroxide sol solution, or mixtures thereof. Additionally, a hydroxide or salt of a component serving as a sintering aid and/or particle growth inhibitor may be dissolved in the above solution. If the aqueous solution contains only a salt or only a hydroxide which gelates in a drying process and loses its function as a binder, it should be added with a binder to be burnt in a firing process.

A foaming agent to be used in the present invention may include, but is not limited to, commonly used saponin and any other suitable surfactants. By way of exception, a surfactant containing sodium and an organic material are undesirable because they cause deterioration in the heat resistance of a sintered ceramic foam.

The present invention may be applied to a method of producing large-size super-lightweight ceramic foams having different shapes, in which a plurality of calcinated preforms of foamed slurry are prepared and then jointed to each other using a foamed slurry prepared in the same way, as proposed by the inventors in Japanese Patent Application No. 2002-088250, which is incorporated herein by reference in its entirety.

The present invention is now illustrated, but not limited, by the following Examples.

EXAMPLE 1

20 g of alumina short fibers having an average length of 1 mm were added, while stirring, into a solution consisting of 200 ml of n-hexane and 0.5 g of aluminum isopropoxide dissolved therein, and the alumina short fibers were dispersed throughout the solution using an ultrasonic cleaner. In parallel, 12 g of aluminum iso-propoxide was added to 150 ml of boiling distilled water, and hydrolyzed under stirring. A white solution obtained by cooling the solution containing the hydrolysate was added with dilute hydrochloric acid under stirring to adjust its pH value at 2, and then peptized under continuous stirring for 4 hours to prepare a limpid aluminum-hydroxide sol solution. This solution was added with 60 g of alumina powder having an average particle size of 0.2 μm, and 0.4 g of Mg $(NO_3)_2 \cdot 6 H_2O$ as an MgO source serving as a particle growth inhibitor for alumina, and these were stirred together with silicon nitride balls for 20 hours to prepare an aqueous slurry of alumina.

This aqueous slurry was quickly added into the above n-hexane solution containing the alumina short fibers dispersed therein, under stirring. After stirring for about 5 minutes, the mixture was left statically and allowed to separate into a nonaqueous phase and an aqueous phase. The supernatant limpid nonaqueous phase was promptly removed through a decantation process. After the removal of the nonaqueous phase, the aqueous phase was heated under stirring for some time to vaporize and remove a small amount of remaining hexane therein so as to obtain 100 ml of concentrated aqueous slurry containing the alumina short fibers dispersed therein. This slurry was added with 10 ml of 20% saponin solution, and foamed using a domestic bubble machine to tenfold the volume thereof. The meringue-like bubbles or foams were filled and dried in a mold made of a paperboard having a size of 8 cm×8 cm×4 cm and an inner surface applied with paradichlorobenzene to form a molded body. The obtained molded body was sintered at 1,350° C. under atmospheric air for 1 hour to obtain an alumina foam.

The alumina foam had a bulk density of 0.11 g/cm$^3$, and a sufficient strength capable of withstanding a pressure applied thereto by fingers without breakage.

EXAMPLE 2

20 g of alumina short fibers having an average length of 1 mm were added, while stirring, into a solution consisting of 200 ml of n-hexane and 0.5 g of aluminum isopropoxide dissolved therein, and the alumina short fibers were dispersed throughout the solution using an ultrasonic cleaner. In parallel, 8 g of aluminum iso-propoxide was added to 150 ml of boiling distilled water, and hydrolyzed under stirring, and an aluminum-hydroxide sol solution was prepared in the same way as that in Example 1. This solution was added with 50 g of alumina powder having an average particle size of 0.2 $\mu$m, and 0.3 g of Mg (NO$_3$)$_2$.6 H$_2$O as an MgO source serving as a particle growth inhibitor for alumina, and an aqueous slurry of alumina was prepared in the same way as that in Example 1. Then, in the same way as that in Example 1, a molded body of ceramic foam having a size of 8 cm×8 cm×4 cm was obtained. The obtained molded body was sintered at 1,450° C. under atmospheric air for 1 hour to obtain an alumina foam. The alumina foam had a bulk density of 0.08 g/cm$^3$, and a sufficient strength capable of withstanding a pressure applied thereto by fingers without breakage.

EXAMPLE 3

10 g of alumina short fibers having an average length of 1 mm were added, while stirring, into a solution consisting of 150 ml of n-hexane and 0.5 g of aluminum iso-propoxide dissolved therein, and the alumina short fibers were dispersed throughout the solution using an ultrasonic cleaner. In parallel, 16 g of aluminum iso-propoxide was added to 100 ml of boiling distilled water, and hydrolyzed under stirring. After the completion of hydrolysis, the solution was heated and evaporated to about 50 ml, and then cooled. The obtained solution was added with dilute hydrochloric acid under stirring to adjust its pH value at 2, and then peptized under continuous stirring for 4 hours. This solution was then added with 0.1 g of Mg (NO$_3$)$_2$.6 H$_2$O to prepare a limpid aluminum-hydroxide sol solution. This aluminum-hydroxide sol solution was added into the above n-hexane solution, and then a molded body of ceramic foam having a size of 8 cm×8 cm×2 cm was obtained in the same way as that in Example 1. The obtained molded body was sintered at 1,650° C. under atmospheric air for 1 hour to obtain an alumina foam. The alumina foam had a bulk density of 0.04 g/cm$^3$.

Although the present invention has been described in specific features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A method of producing a super-lightweight ceramic foam, comprising the steps of:

adding ceramic short fibers into a nonaqueous solvent containing a metal alkoxide dissolved therein;

dispersing said ceramic short fibers in said nonaquoeus solvent;

adding one of an aqueous slurry containing ceramic powder, and an aqueous solution containing a component serving as a raw material of ceramic powder dissolved therein, into said nonaqueous solvent;

stirring the mixture;

allowing said mixture to separate into an aqueous phase and an nonaqueous phase;

removing said nonaqueous phase to obtain an aqueous slurry containing said ceramic short fibers dispersed therein;

adding a foaming agent into said slurry;

foaming said slurry under mechanical stirring;

filling and drying said foamed slurry in a mold to form a molded body; and firing said molded body.

2. The method as claimed in claim 1, wherein said ceramic short fibers are added into said nonaqueous solvent in the range of 5 to 95 weight % relative to the ceramic powder in said aqueous slurry or the raw material of ceramic powder dissolved in said aqueous solution.

3. The method as claimed in claim 1 or 2, wherein said aqueous slurry or said aqueous solution includes mixed therewith or dissolved therein a substance serving as a sintering aid and/or a particle growth inhibitor.

4. The method as claimed in claim 1, wherein said metal alkoxide is dissolved in said nonaqueous solvent in a range of 0.1 to 20 weight parts per 100 weight parts of said ceramic short fibers dispersed in said nonaquoeus solvent.

5. The method as claimed in claim 4, wherein said metal alkoxide is dissolved in said nonaqueous solvent in a range of 0.5 to 10 weight parts per 100 weight parts of said ceramic short fibers dispersed in said nonaqueous solvent.

6. The method as claimed in claim 1, wherein said ceramic short fibers are dispersed in said nonaqueous solvent in a range of 10 weight parts or more per 100 weight parts of said nonaqueous solvent, and the volume of said aqueous slurry or aqueous solution added to said nonaqueous solvent is at least 25% of the volume of said nonaqueous solvent.

7. The method as claimed in claim 1, wherein said aqueous slurry or aqueous solution further contains a peptizer.

8. The method as claimed in claim 7, wherein said peptizer is selected from the group consisting of an acid, a base, and a polyacrylic ammonium.

* * * * *